March 9, 1926.
W. P. MacMICKING
AUTOMOBILE SIGNAL
Filed April 20, 1925
1,575,854
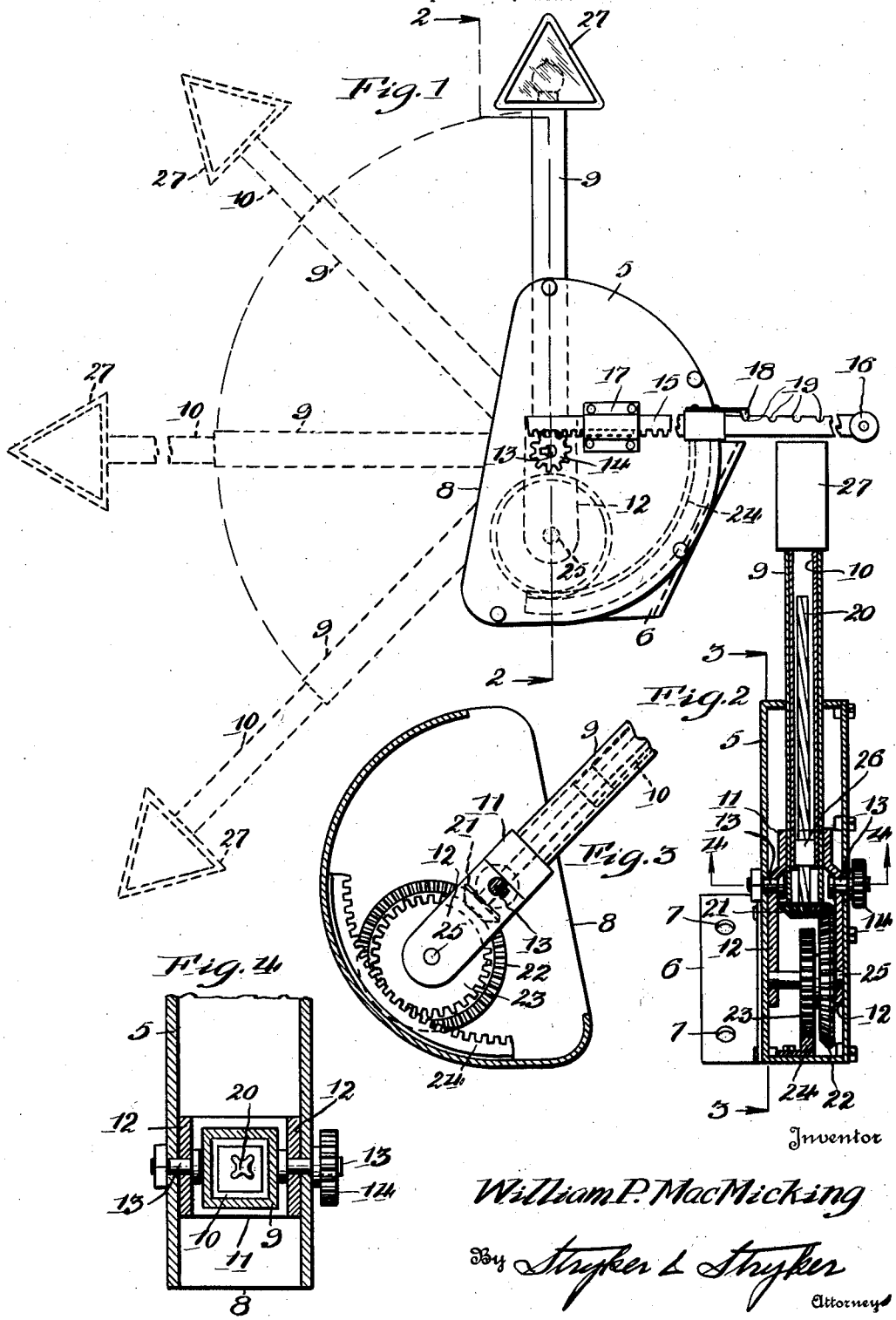
Inventor
William P. MacMicking
By Stryker & Stryker
Attorneys Patented Mar. 9, 1926.

1,575,854

UNITED STATES PATENT OFFICE.

WILLIAM P. MacMICKING, OF ST. PAUL, MINNESOTA.

AUTOMOBILE SIGNAL.

Application filed April 20, 1925. Serial No. 24,316.

*To all whom it may concern:*

Be it known that I, WILLIAM P. MAC-MICKING, a citizen of the Dominion of Canada, residing at St. Paul, in the county of Ramsey and State of Minnesota, have invented new and useful Improvements in Automobile Signals, of which the following is a specification.

It is my object to provide a novel, simple and compact signal for automobiles, which is adapted to be operated to indicate either left or right turns or stopping of the vehicle.

A further object is to provide a device of this kind adapted to display signals corresponding to the arm signals generally adopted for motor vehicles by means of a single, mechanically operated arm.

This invention also includes certain other novel features of construction which will be fully pointed out in the following specification and claims.

Referring to the drawings which illustrate the best form of my device at present known to me, Figure 1 is a rear elevation of my improved signal, the positions of the arm when extended being indicated in dotted lines; Fig. 2 is a section taken on the line 2—2 of Fig. 1; Fig. 3 is a fragmentary section taken on the line 3—3 of Fig. 2 and Fig. 4 is a horizontal section taken on the line 4—4 of Fig. 2.

As illustrated, I provide a casing 5 adapted to be bolted or otherwise secured to one side of a motor vehicle by attaching a bracket 6 thereto. This bracket is rigidly secured to one side of the casing 5 and is perforated at 7 to receive fastening bolts. A normally outer edge 8 of the casing 5 is open so that an arm, composed of outer and inner telescoping members 9 and 10 respectively, may be projected from said casing. The outer arm member 9 is rigidly secured to a yoke 11 having reaches 12 which normally extend downward adjacent to the inner surfaces of the sides of the casing 5. This yoke 11 is pivotally mounted in the casing 5 upon pintles 13 arranged in axial alignment, one with the other, in opposite sides of the casing.

One of the pintles 13 has a squared shank engaging the yoke 11, and keyed to a projecting end of this squared pintle is a pinion 14 provided with an external rack 15 having a handle 16 adapted to be manipulated to rotate said pinion and thereby extend the signal arm from the casing 5. The rack 15 is slidable in a suitable guide 17 attached to the casing 5 and has a spring pressed dog 18 adapted to be mounted on the vehicle body. The dog 18 is arranged to engage suitable notches 19 in the upper edge of the rack handle.

To extend and retract the inner arm member 10 from the outer member 9, when the arm is pivoted upon the pintles 13, I provide a spirally fluted or threaded rod 20 within the member 10, which is adapted to be rotated by suitable gearing within the casing 5. This gearing consists of a beveled pinion 21 on the normally lower end of the rod 20, a beveled gear 22 in mesh with the pinion 21 and a gear 23 adapted to be rotated by engagement with an arcuate rack 24 fixed within the casing 5. The gears 22 and 23 are rigidly secured one to the other so as to be revoluble together upon a small shaft 25 mounted in the extremities of the reaches 12. A nut 26 is fixed in the normally lower end of the inner arm member 10 and formed to engage the threads of the rod 20. To prevent rotation of the member 10 within the member 9 of the arm, said members may conveniently be made rectangular in cross section, as clearly shown in Fig. 4. On the normally upper or outer end of the inner arm member 10, I mount the usual triangular head 27, which may be illuminated by an electric lamp when the arm is extended.

*Operation.*

In operation, the signal arm is normally maintained in substantially vertical position, as shown in full lines in Fig. 1, by engagement of the lug 18 in one of the notches 19 of the rack handle.

To indicate a change of direction or stopping of the vehicle, the handle 16 is merely thrust to the left (Fig. 1). This, as will be readily understood, causes the rack 15 to rotate the pinion 14 and thereby tilt the yoke 11 carrying the arm members 9 and 10 upon the pintles 13. Tilting the yoke moves the gear 23 over the arcuate rack 24 and thereby rotates the gears 21 and 22 and rod 20. Rotation of the threaded rod 20 in engagement with the nut 26, causes the member 10 to be extended from the member 9, as indicated in dotted lines in Figure 1. When the arm members reach their horizontal position, the member 10 is fully extended, and as the head 27 is further lowered, the arm remains in extended position.

Either a left or right turn may be indicated or a stop signal may be given by extending the signal arm at different angles. Thus, to indicate a right turn, the handle 16 is moved so as to bring the spring pressed lug 18 into the second notch from the left (Fig. 1). This brings the arm members to their upwardly pointed position, in which they are at about 45 degrees from the vertical. Similarly, by further movement of the handle 16, the arm members may be brought to horizontal position to indicate a left turn, or to the oblique downwardly directed position shown in dotted lines in Fig. 1, the latter position indicating that the vehicle is to stop.

As will now be readily understood, by my arrangement of telescoping arm members adapted to be extended, I make it possible to display conspicuous, clear signals and at the same time effect economy in the space occupied by the signal when retracted. The device of the present invention is unusually durable in construction and positive in its operation, and obviates the necessity for a pair of signals, one on each side of the vehicle.

Having described my invention what I claim as new and desire to protect by Letters Patent is:

1. In a signal, a telescoping arm adapted to be mounted in substantially vertical position on a motor vehicle, said arm having tubular sections fitting one within another, a member of said arm adapted to be extended and retracted, a signal on the normally outer end of said member, means for tilting said arm to substantially horizontal position and means for positively extending said arm member when said arm is tilted.

2. In a signal, a telescoping arm adapted to be mounted in substantially vertical position on a motor vehicle, said arm having tubular sections fitting one within another, a member arranged on said arm to be extended and retracted, a signal on the normally outer end of said member, manually operable means for pivoting said arm to project from the side of a vehicle and gearing for positively extending said member when said arm is tilted.

3. In a signal, a telescoping arm adapted to be tiltably mounted on a motor vehicle, a member arranged on said arm to be extended and retracted, a signal on the normally outer end of said member, a rod threaded in said member, means for tilting said arm to project from the side of a vehicle and means for rotating said rod to thereby positively extend said arm member when said arm is tilted.

4. In a device of the class described, a casing, an arm member pivoted to swing in a substantially vertical plane in said casing, a second arm member slidable within said first mentioned member and having a signal mounted on the outer end thereof, a revoluble rod threaded within said second member, means for tilting said members and gearings adapted to rotate said rod when said members are tilted and thereby extend said second member from said first mentioned member.

5. In a device of the class described, a casing, an arm member pivoted to swing in a substantially vertical plane in said casing, a second arm member slidable within said first mentioned member, a signal mounted on the outer end of said second member, a revoluble rod threaded within said second mentioned member, means for tilting said arm members, an arcuate rack fixed in said casing and gearings arranged to engage said rack and adapted to rotate said rod when said members are tilted and thereby extend said second member from said first mentioned member.

In testimony whereof, I have hereunto signed my name to this specification.

WILLIAM P. MacMICKING.